Patented Sept. 15, 1942

2,295,606

UNITED STATES PATENT OFFICE 2,295,606

LUTIDINE COMPOUNDS

George Riethof, Mount Lebanon, Pa., assignor to Pittsburgh Coke & Iron Company, Pittsburgh, Pa., a corporation of Pennsylvania No Drawing. Application July 31, 1941, Serial No. 404,932

7 Claims. (Cl. 260—295)

This invention relates to lutidine compounds; and it comprises new crystalline compounds containing urea combined with 2:6 lutidine in a molar ratio of approximately 2:1, these crystalline compounds being sufficiently soluble in water to be useful in dye baths and for other purposes; and it further comprises a method of making such crystalline materials wherein urea is combined with 2:6 lutidine in aqueous solution and the crystalline product is separated from the mother liquor, the separated crystalline material being sometimes subsequently decomposed to recover pure 2:6 lutidine; and it also comprises methods of recovering pure 2:6 lutidine from mixtures of alkylated pyridines contained in distillates of basic coal tar oils; all as more fully hereinafter set forth and as claimed.

As is well known, various alkylated pyridines such as the picolines, lutidines, etc., are obtained in the destructive distillation of coal and occur in coke oven gas and tar. These alkylated pyridines may be recovered from the tar or, together with ammonia, from the gas. The picolines and the lutidines after recovery can be purified by fractional distillation but it is difficult to produce pure products. This is particularly difficult in separating 2:6 lutidine and the picolines. Their boiling points and chemical properties are quite closely analogous. One such commercial cut is the "picoline" cut boiling between 137° and 145° C. While this mixture is known commercially as "beta picoline" it contains in addition to beta picoline relatively large amounts of gamma-picoline and of 2:6 lutidine. One commercial "beta picoline" cut contains about 70 per cent beta and gamma picolines together, and about 30 per cent 2:6 lutidine. It is a convenient source of 2:6 lutidine and is so utilized in the present invention.

An object achieved in the present invention is the recovery of 2:6 lutidine from this beta picoline cut, by a new method based upon the discovery that 2:6 lutidine has a characteristic reaction with urea under certain conditions leading to the production of a highly crystalline material not very soluble in water, solubility not being great enough to preclude recovery of substantial crops of crystals. The new compound contains the urea and lutidine combined in a molar ratio of 2:1. The crystals carry some water of crystallization; probably about one mol. Most, though not all of the lutidine of the cut comes down in this crystalline precipitate. In the mother liquor the ratio of lutidine to the picolines is much less.

In utilizing the discovery an aqueous mixture of urea and commercial beta picoline is warmed until a clear solution is obtained and then the warm solution is cooled to crystallize out the urea-lutidine compound. By slow cooling, I obtain large, coarse, columnar crystals, many of which are over an inch in length. Usually the crystals are filtered from the mother liquor and washed free of adhering mother liquor. Because of the coarse crystallinity of the compound and its limited solubility in cold water, not much wash water is required. Any free urea contained in the crystals proper goes with the adhering mother liquor. The washed crystals are then dried, ordinarily by air drying.

The dried crystals are soluble in water and aqueous solutions. The colder the wash water, the less of the compound goes in solution in washing. The aqueous solutions are stable under ordinary conditions. The crystals are substantially insoluble in cold ethyl alcohol and alcohol may be used in washing the wet crystals. The washed crystals are dried as before.

The new crystalline products are useful for various purposes; for example, in dyeing textiles in uniform shades. They act as wetting out agents in the dye bath and facilitate penetration of the dye during dyeing. Accordingly, they are particularly useful with dyestuffs not readily soluble in water.

The new materials are also useful as pharmaceuticals, insecticides, as moth-proofing agents etc. Further, they are valuable chemical intermediates in the preparation of other chemical compounds. They are particularly useful as a source of pure 2:6 lutidine; a substance which is obtained in a pure state. As noted it cannot be recovered by fractional distillation of coal tar oils. The crystalline compound can be resolved into lutidine and urea by relatively simple methods.

It is a remarkable fact that the crystalline compounds on heating to a moderate temperature pyrolyze giving back 2:6 lutidine and urea as separate layers. The urea can go back in cycle.

The dry crystalline product heated to approximately 130° C., first melts and then stratifies into two layers: a lower layer of molten urea and an overlying layer of substantially pure 2:6 lutidine. The lutidine can be drawn off from the molten urea or it can be removed by distillation. However, it is simpler and easier, and perhaps better, to cool the stratified lutidine and molten urea to solidify the urea and then separate the liquid lutidine from the solidified urea. The so separated lutidine may be redistilled if desired.

Thus, dry, chemically pure 2:6 lutidine can be readily obtained from my new crystalline products, which in turn are readily prepared from a distillate of such basic coal tar oils as the picoline cut.

In working up the "beta picoline" cut for the recovery of the two picolines contained, beta and gamma, it is convenient to use the method just described for removing the bulk of the 2:6 lutidine prior to other steps.

In certain methods of separating beta picoline and gamma picoline by reaction with benzaldehyde, as described in another copending application Serial No. 404,933, the presence of lutidine is uneconomical as causing too much consumption of benzaldehyde.

The mother liquors remaining after the separation of the crystals of the urea compound contain practically all of the beta and gamma picoline present in the original mixture. In an advantageous embodiment of my invention, after separating the crystals of the urea compound from the residual picoline solution, the mother liquor is distilled until the molten residue in the still is substantially fused urea. The urea so obtained may be recovered and re-used. The distillate is an aqueous solution of beta and gamma picoline, together with some 2:6 lutidine. This distillate is treated with solid caustic soda to remove water and dry the picoline mixture. Sufficient caustic soda is added to stratify the distillate into an aqueous caustic soda layer and a picoline layer. The picoline layer is separated from the aqueous layer and is re-distilled to obtain a dry picoline mixture; an oil containing a relatively large amount of beta picoline, together with gamma picoline and some 2:6 lutidine. This oil is then treated to separate the beta picoline and the gamma picoline.

In the following examples I have described certain advantageous embodiments of the present invention:

Example I

In this example I use a commercial picoline cut boiling between 137° and 145° C. and having approximately the following composition by weight: 35 per cent beta-picoline, 35 per cent gamma-picoline and 30 per cent 2:6 lutidine. An aqueous solution of urea is prepared by dissolving 900 grams of urea in 600 cc. of water heated to 80° C. To the warm urea solution so obtained are added 1360 grams (1400 cc.) of the described technical beta-picoline. The mixture is agitated and warmed at 80° C. until a clear uniform liquid is obtained. The temperature should be held below 85° C. Otherwise the mixture will separate into two layers. However 80° C. is an advantageous temperature for the production of a clear uniform solution.

The clear liquid is gradually cooled to 29° C., the rate of cooling being such as to produce large coarse crystals. In doing so, from 5 to 6 hours are ordinarily required to cool the batch from 80° C. to 29° C. and produce large, coarse crystals. The crystals so obtained are filtered off from the mother liquor and washed with small amounts of cold water or alcohol to remove adhering mother liquor and any free urea contained in the crystal crop. The washed crystals are then air dried on filter paper. Approximately 441 grams of dry crystals are obtained from the batch of materials stated.

The dry crystals melt at approximately 130° C. and decompose at this temperature forming two layers; the lower being molten urea and the upper being substantially pure lutidine. This particular feature of the present invention is further illustrated in the following example.

Example II

This example illustrates the production of pure 2:6 lutidine from my crystalline urea-lutidine products.

Into a suitable vessel there are introduced 441 grams of the dry crystals obtained in Example I. The crystals are melted by gradually heating to approximately 130° C. The molten mixture is maintained at this temperature until it stratifies into two layers. Then the stratified layers, still in contact with each other, are cooled until the molten urea solidifies. The liquid lutidine layer is then drawn off. The recovered lutidine contains a small amount of water but is substantially chemically pure. It does not carry the picolines of the original material. It may be re-distilled. This pure 2:6 lutidine is useful for many purposes.

The foregoing Examples I and II taken together are illustrative of my two-step method of recovering pure 2:6 lutidine from mixtures of alkylated pyridines containing the same, including the mixtures obtained as technical products described; mixtures of 2:6 lutidine with beta picoline and gamma picoline.

Example III

The mother liquor obtained in Example I is introduced into a suitable still and heated to distill off the alkylated pyridines and water. The distillation is continued until the molten residue in the still is substantially fused urea which may go back in cycle.

The distillate so obtained is collected in a suitable receiver. It is an aqueous solution of alkylated pyridines, mainly beta and gamma picolines. This aqueous mixture is treated with solid caustic soda to remove water and dry the picoline mixture. In doing so, sufficient caustic soda is added to cause the treated mixture to stratify into an aqueous layer and a picoline layer. The two layers are separated.

The picoline layer is re-distilled to obtain a dry mixture of alkylated pyridine. The distillate collected after the vapors reach a temperature of 142° C. is an oil having approximately the following composition by weight: 40 per cent beta picoline, 45 per cent gamma picoline and 15 per cent 2:6 lutidine. This oil differs from the original picoline cut in that the percentage of lutidine is substantially less, making it better suited for recovering beta and gamma picoline. In this oil the ratio of beta picoline, gamma picoline and 2:6 lutidine is approximately 40:45:15.

What I claim is:

1. As a new composition of matter, the crystalline reaction products of urea with lutidine, said reaction products being soluble in water.

2. As a new composition of matter, a crystalline urea-lutidine compound containing urea combined with 2:6 lutidine in a molar ratio of approximately 2:1, said crystalline compound being soluble in water and slightly soluble in cold ethyl alcohol.

3. In the manufacture of crystalline reaction products from 2:6 lutidine, the process which comprises reacting urea with 2:6 lutidine in aqueous solution and recovering the crystalline reaction product so obtained.

4. The process of claim 3 wherein the recovered crystalline reaction products are subsequently heated to a temperature sufficient to liberate the 2:6 lutidine and regenerate the urea.

5. In a method of recovering pure 2:6 lutidine from mixtures of alkylated pyridines also containing beta and gamma picoline, the improved process which comprises reacting urea with the mixed alkylated pyridines in aqueous solution to convert the 2:6 lutidine into a crystalline reaction product, separating the crystalline reaction product from the mother liquor and decomposing the recovered crystalline product to liberate the 2:6 lutidine and recover urea.

6. The process of claim 5 wherein the liberated 2:6 lutidine is separated from the regenerated urea and is re-distilled to obtain a dry pure 2:6 lutidine.

7. The process of claim 5 wherein the separated mother liquor is distilled to recover a mixture of alkylated pyridine containing an enriched content of beta picoline.

GEORGE RIETHOF.